Patented June 6, 1950

2,510,432

UNITED STATES PATENT OFFICE 2,510,432

INSECT PROOFING WOOLEN FABRICS WITH 2,3-DIARYL INDOLES

William D. Stewart, Yonkers, N. Y., assignor to The B. F. Goodrich Company, New York, N. Y., a corporation of New York No Drawing. Application May 18, 1948,
Serial No. 27,821

1 Claim. (Cl. 117—138.5)

This invention relates to the control of insects with diaryl indoles and pertains particularly to the use of diphenyl indole to prevent damage of woolen fabrics by spotted carpet beetles.

I have discovered that compositions containing diaryl indoles possess marked insecticidal properties and that these compositions are exceedingly effective against mosquitoes, especially mosquito larvae and spotted carpet beetles in concentrations as low as 0.1 part per million. Although in general, diaryl indoles as a class possess insecticidal properties, the preferred aryl indoles according to this invention are the 2,3-diaryl indoles such as 2,3-diphenyl indole.

The 2,3-diaryl indoles can be readily and conveniently prepared by known methods. For example, 2,3-diphenyl indole can be prepared by the condensation of benzoin and aniline in the presence of zinc chloride.

The following specific examples illustrate the insecticidal activity of diaryl indoles.

EXAMPLE I

A small quantity of 2,3-diphenyl indole was dissolved in acetone and the resulting solution was dispersed in sufficient water to give the desired concentration. These solutions readily dispersed when added to water. Such aqueous dispersions in various concentrations were employed against mosquito larva of the species *Culex quinquefasciatus* by placing a known number of larvae in such aqueous dispersions. The results of these tests are tabulated below:

Culex quinquefasciatus *larvae*

| 2,3-Diphenyl Indole Concentration, P. P. M. | Percent Kill 24 hours |
|---|---|
| 10 | 100 |
| 1.0 | 100 |
| 0.1 | 40 |
| 0 | 0 |

EXAMPLE II 2,3-diaryl indole was also employed against larvae of *Anopheles quadrimaculatus* which are much more difficult to control than the *Culex quinquefasciatus*. The procedure was the same as used in Example I. The results of these tests are tabulated below:

Anopheles quadrimaculatus

| 2,3-Diphenyl Indole Concentration, P. P. M | Percent Kill 24 hours |
|---|---|
| 10 | 100 |
| 1.0 | 100 |
| 0.1 | 100 |
| 0 | 0 |

The above examples indicate that mosquito larvae may be effectively controlled by treating the larvae in their natural habitat, as in pools, ponds, rainbarrels, etc. with 2,3-diphenyl indole.

EXAMPLE III

Spotted carpet beetles, *Anthrenus vorax*, and their larvae were placed on woolen fabric in a test chamber which permitted as near natural freedom as is possible in such tests. The woolen test pieces were treated with solutions and aqueous dispersions of 2,3-diphenyl indole. By these tests it was found that 100% of the beetles and larvae were killed in 24 hours at concentrations of 2,3-diphenyl indole of 0.5% and 1.0% on the fabric. These fabrics were dry cleaned with a mixture of carbon tetrachloride and benzene and subjected to spotted carpet beetles and larvae again. Even after dry cleaning there was no evidence of feeding and 50% of these insects were dead in 24 hours.

2,3-diphenyl indole has also been found to possess insecticidal activities against black carpet beetles (*Attagenus piceous*) and *Dermestes vulpinus*.

The concentration of diaryl indole employed in insect control can be varied from the above concentrations if desired without destroying the effectiveness of the material. Also, such other diaryl indoles as the 2,3-ditolyl indoles can be employed with substantially the same results.

The diaryl indoles can be successfully employed in insect control as aqueous dispersions either with or without a wetting or dispersing agent, or dissolved in suitable solvents such as acetone and alcohol, or dispersed in such finely-divided solids as bentonite, talc, flour, wood flour, sulfur, etc.

Having disclosed specific examples of my invention, I do not desire or intend to limit myself solely thereto, for, as hitherto stated, the concentration of the active ingredient may be varied or the medium carrying the active ingredient may be varied, if desired, without departing from the spirit and scope of my invention as defined in the appended claim.

I claim:

A woolen fabric containing 0.5% to 1.0% by weight of 2,3-diphenyl indole deposited thereon.

WILLIAM D. STEWART.

REFERENCES CITED

The following references are of record in the file of this patent:

FOREIGN PATENTS

| Number | Country | Date |
|---|---|---|
| 574,840 | Germany | Apr. 20, 1933 |

OTHER REFERENCES

Chem. Abstracts, vol. 41, page 3576a (1947).